United States Patent [19]

Caron

[11] 4,415,232
[45] Nov. 15, 1983

[54] OPTICAL WAVEGUIDE SPLICE

[75] Inventor: Bernard G. Caron, Harrisburg, Pa.

[73] Assignee: AMP Incorporated, Harrisburg, Pa.

[21] Appl. No.: 244,454

[22] Filed: Mar. 16, 1981

[51] Int. Cl.³ .............................................. G02B 7/26
[52] U.S. Cl. ................................ 350/96.21; 350/96.20
[58] Field of Search ................ 350/96.20, 96.21, 96.22

[56] References Cited

U.S. PATENT DOCUMENTS

| | | | |
|---|---|---|---|
| 3,637,284 | 1/1972 | Plyler | 350/96.20 |
| 3,705,756 | 12/1972 | Keller et al. | 350/96.20 |
| 3,946,467 | 3/1976 | Lukas et al. | 350/96.20 X |
| 3,951,514 | 4/1976 | Medina, Jr. | 350/96.22 |
| 4,081,208 | 3/1978 | Meade | 350/96.20 |
| 4,134,641 | 1/1979 | Kao et al. | 350/96.21 |
| 4,186,997 | 2/1980 | Schumacher | 350/96.21 |
| 4,193,665 | 3/1980 | Arnold | 350/96.22 |
| 4,205,898 | 6/1980 | Matthews et al. | 350/96.21 |

FOREIGN PATENT DOCUMENTS 2421395 11/1979 France ........................... 350/96.20

*Primary Examiner*—John D. Lee
*Assistant Examiner*—Frank González
*Attorney, Agent, or Firm*—Richard B. O'Planick; Adrian J. LaRue

[57] ABSTRACT

A splice for axially aligning a pair of optical fibers is disclosed, comprising a bored receptacle, and a pair of tubular retention sleeves positioned within the receptacle bore. Each sleeve receives a respective optical fiber therethrough, and structurally provides a plurality of outward tine projections which engage the receptacle to inhibit withdrawal of the sleeve from the receptacle bore. Each sleeve further provides inward tine projections which engage the cladding layer of the optical fiber to inhibit withdrawal of the fiber from the tubular sleeve.

6 Claims, 3 Drawing Figures

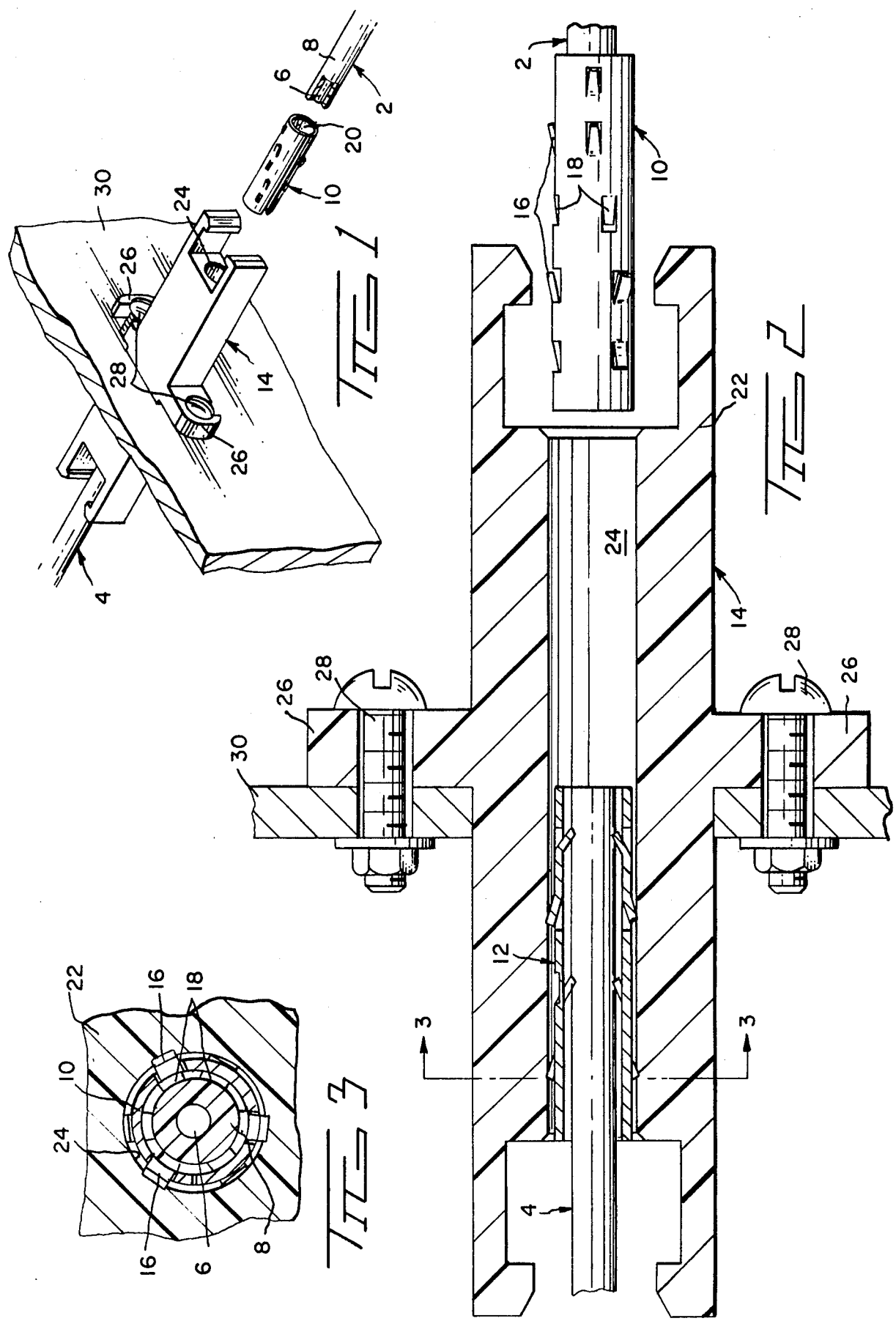

OPTICAL WAVEGUIDE SPLICE

BACKGROUND OF THE INVENTION

1. Field of the Invention

The present invention relates to splice assemblies for mechanically joining and axially aligning a pair of optical fibers. More specifically, the invention relates to splicing optical fibers of the general fiber type which comprises a center waveguide core and an outer cladding layer of plastic construction and relatively large size.

2. The Prior Art

As fiber optics becomes increasingly used in communications and data transmissions systems, the need has arisen for an inexpensive and efficient method for splicing a pair of optical fibers together. In particular, the industry has been in need of a splice system, comprising a relatively few number of component parts, which performs at a sufficiently high degree of coupling efficiency, to mechanically and optically couple a pair of optical fibers. Splices which are presently available are suited for use in high-performance applications, but are relatively ill-suited for those applications which require a low-performance, and inexpensive, splicing mechanism. Further, presently available splices comprise a substantial number of component parts, which increases the time required to terminate a fiber, and increases the cost of the splice unit. Still further, a large number of parts complicates the termination of an optical fiber, and requires that a high degree of control be maintained over the manufacture of the splice components in order for the unit to operate at a specified performance level.

SUMMARY OF THE PRESENT INVENTION

The present invention relates to a splice assembly for mechanically and optically coupling a pair of optical fibers. The assembly comprises a bored receptacle, and a pair of tubular retention sleeves intended for positionment within the receptacle bore. Each sleeve receives a respective optical fiber therethrough, and provides outward tine projections which resiliently engage the receptacle to inhibit withdrawal of the sleeve from the receptacle bore. Each sleeve further provides inward tine projections which resiliently engage the cladding layer of the optical fiber to inhibit withdrawal of the fiber from the tubular sleeve. Hence, the subject invention comprises a splice assembly composed of substantially three component parts. Further, as the retention sleeves are positioned within the receptacle bore from alternate ends, and in opposition to one another, the sleeves are located on the center axis of the receptacle, and thereby effectuate an efficient, yet inexpensive, optical and mechanical coupling of the two optical fibers.

Accordingly, it is an object of the present invention to provide a splice assembly for mechanically and optically coupling a pair of optical fibers.

A further object of the present invention is to provide a splice assembly for coupling a pair of optical fibers, comprising a relatively few number of component parts.

Yet a further object of the present invention is to provide a splice assembly for coupling a pair of optical fibers which is readily appliable without requiring specialized tooling.

Still further, it is an object of the present invention to provide a splice assembly for coupling a pair of optical fibers, which may be hand-assembled.

A further object of the present invention is to provide a splice assembly for coupling a pair of optical fibers which is economically and readily produced.

These and other objects, which will become apparent to one skilled in the art, are achieved by a preferred embodiment which is described in detail below, and which is illustrated in the accompanying drawings.

BRIEF DESCRIPTION OF THE ACCOMPANYING DRAWINGS

FIG. 1 is an exploded perspective view of the subject splice assembly, with the receptacle component mounted to project through a bulkhead, and with one retention sleeve exploded from the receptacle bore.

FIG. 2 is a longitudinal section view through the subject splice assembly illustrated in FIG. 1, illustrating one of the retention sleeves positioned in assembled condition, and one retention sleeve external of the receptacle bore.

FIG. 3 is a transverse section view through the subject splice assembly illustrated in FIG. 2, taken along the line 3—3, and illustrates operation of the retention sleeve tines in effecting retention of the component parts in the assembled condition.

DETAILED DESCRIPTION OF THE PREFERRED EMBODIMENT

Referring first to FIG. 1, the subject splice assembly is intended to mechanically and optically couple a pair of optical fibers 2, 4 of the general fiber type comprising a waveguide core 6 encased within an outer cladding sheath 8. The splice assembly comprises a pair of retention sleeves 10, 12, and a splice bushing 14 which is suited for projection through a bulkhead or the like. As best viewed in FIG. 2, each retention sleeve 10, 12 comprises a plurality of annularly-spaced and outwardly-projecting tines 16 formed therefrom. The tines 16 project outwardly, and are biased in a rearward direction for a purpose explained below. In addition, each retention sleeve further constitutes a plurality of annularly-located and inwardly-projecting tines 18, which are biased to project into an axial sleeve bore 20. It will be appreciated that the precise number of projections 16, 18 is not critical, and that the projections are spaced apart and formed by a stamping operation through the metallic retention sleeve, forming the projections accordingly.

The splice bushing 14, with continued reference to FIG. 2, comprises an elongate housing 22 having an axial bore 24 extending therethrough. The housing 22 further is adapted to provide an annular flange 26 which is located intermediate the length thereof, and which receives a pair of mounting screw/nut assemblies 28. As stated previously, the housing 22 is adapted to be mounted onto a bulkhead 30, as shown in FIG. 1.

With combined reference to FIGS. 1 and 2, the subject splice assembly operates as follows. The optical fiber 2 is inserted through the axial sleeve bore 20, and severed to a coplanar relationship with a forward end of the sleeve. The forward bias of the inward tines 18 of the retention sleeve permits engagement between the inserted optical fiber 4 and the tines 18, yet does not prohibit advancement of the optical fiber through the retention sleeve. The tines 18 are resiliently biased against the outer cladding sheath 8 of the optical fiber at this point. Thereafter, by exerting an axial force on the optical fiber in a rearward direction, the optical fiber is drawn backwards in the retention sleeve until the inward tines 18 of the retention sleeve penetrate into the cladding sheath. Thus, the retention tines 18 operate to establish a mechanical engagement between the retention sleeve and the optical fiber extending therethrough, and further operate to inhibit a rearward withdrawal of the optical fiber from the retention sleeve. The forward portion of the waveguide is located substantially coplanar with a forward end of its respective retention sleeve.

With particular reference to FIG. 2, each retention sleeve, having been mechanically attached to the optical fiber as described above, is inserted into a respective end of axial bore 24 of the housing 22. The rearward bias of the outer tines 16 of the retention sleeve permit a regular progression of the retention sleeve into the axial bore, and establish a resilient engagement with the sidewalls defining the axial bore 24. When the retention sleeve has been advanced so that the forward end of the retention sleeve is located approximately intermediate of the axial bore 24, a second rearward axial force is exerted upon the optical fiber 4, which causes the outer tines 16 of the sleeve to plow into the sidewalls defining the axial bore 24. Consequently, the retention sleeve is securely retained within the housing 22, by operation of the resilient outward tines 16. Also, the axis of the retention sleeve 12 is fixedly located on the axis of the housing bore 24. When the opposite retention sleeve is inserted into its respective end of the bore, and brought into abutting opposition to the first retention sleeve, the pair of optical fibers are axially aligned and an optical coupling is thereby established. FIG. 3 represents in section view the operation of the outward and inward tines of the retention sleeve in operating to secure a positive mechanical engagement between the optical fiber and retention sleeve, and between the retention sleeve and the splice housing.

It will be readily appreciated that in providing an optical splice assembly comprising three major component parts, the subject invention can be manufactured in an inexpensive manner. The housing 22 is intended to be produced from a plastics material, and the retention sleeves 10, 12 are preferrably composed of a metallic composition. Moreover, retention sleeves 10, 12 are intended to be produced from a stamped blank, which is subsequently formed into its final tubular shape. Moreover, it will be further appreciated that assembly of the subject invention may be effectuated manually, without requiring the use of specialized assembly tools. This further provides an advantage in cost savings, and permits ready assembly of the splice under field conditions.

While the above description is of the preferred embodiment, other embodiment, which will become apparent to one skilled in the art, and which utilize the teachings herein set forth, are intended to be within the scope and spirit of the subject invention.

What is claimed is:

1. A retention member for retaining an end of a fiber optic transmission member covered with cladding material within a bore of a receptacle member, comprising:
   a sleeve member having a first series of inwardly-projecting tines angularly spaced around said sleeve member and a second series of outwardly-projecting tines angularly spaced around said sleeve member;
   said inwardly-projecting tines extending in a forward direction to enable an end of a fiber optic transmission member to be inserted into said sleeve member with said inwardly-projecting tines resiliently biased against the cladding material, said inwardly-projecting tines penetrating the cladding material upon exertion of an axial force on the fiber optic transmission member in a rearward direction, thereby securing the end of the fiber optic transmission member in said sleeve member;
   said outwardly-projecting tines extending in a rearward direction to enable the sleeve member to be inserted in a bore of a receptacle member with said outwardly-projecting tines resiliently engaging the bore surface, said outwardly-projecting tines plowing into the bore surface upon exertion of an axial force on the fiber optic transmission member in a rearward direction thereby securing said sleeve member in said bore.

2. A retention member as set forth in claim 1, wherein a forward end surface of the fiber optic transmission member, when positioned in said sleeve member, is coplanar with a forward end of said sleeve member.

3. A fiber optic connector for connecting ends of fiber optic transmission members covered with cladding material, comprising:
   receptacle means having bore means extending therethrough;
   sleeve means secured onto the cladding material of the ends of fiber optic transmission members;
   a first series of inwardly-projecting tines angularly spaced around said sleeve means, said inwardly-projecting tines extending in a forward direction in engagement with the cladding material thereby securing the ends of the fiber optic transmission members in said sleeve means;
   a second series of outwardly-projecting tines angularly spaced around said sleeve means, said outwardly-projecting tines extending in a rearward direction in engagement with a surface defining said bore means thereby securing the ends of the fiber optic transmission members in said receptacle means in axial alignment.

4. A fiber optic connector as set forth in claim 3, wherein said bore means and said sleeve means are substantially cylindrical.

5. A fiber optic connector as set forth in claim 3, wherein forward end surfaces of the fiber optic transmission members are coplanar with forward ends of respective ones of said sleeve means.

6. A fiber optic connector as set forth in claim 5, wherein the forward ends of said sleeve means are positioned in opposed abutment within said bore means.

* * * * *